United States Patent
Broussard et al.

(10) Patent No.: US 9,716,666 B2
(45) Date of Patent: Jul. 25, 2017

(54) PROCESS CAGE PROVIDING ATTRACTION TO DISTRIBUTED STORAGE

(71) Applicant: International Business Machines Corporation, Armonk, NY (US)

(72) Inventors: Scott J. Broussard, Cedar Park, TX (US); Jacob D. Eisinger, Austin, TX (US); Ritu Mehta, Williamson, TX (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/091,544

(22) Filed: Nov. 27, 2013

(65) Prior Publication Data

US 2015/0149615 A1 May 28, 2015

(51) Int. Cl.
*G06F 15/173* (2006.01)
*H04L 12/911* (2013.01)
*G06F 9/50* (2006.01)

(52) U.S. Cl.
CPC .......... *H04L 47/726* (2013.01); *G06F 9/5083* (2013.01)

(58) Field of Classification Search
USPC ................................................. 709/224, 226
See application file for complete search history.

(56) References Cited

U.S. PATENT DOCUMENTS

| 7,526,515 B2 | 4/2009 | Broussard et al. | |
| 2003/0036882 A1* | 2/2003 | Harper | G06F 11/2035 702/186 |
| 2008/0209434 A1* | 8/2008 | Queck | G06F 9/5033 718/105 |
| 2008/0295171 A1* | 11/2008 | Singh | H04L 63/1416 726/23 |
| 2009/0175196 A1* | 7/2009 | Ford | G06F 9/4862 370/254 |
| 2009/0228589 A1 | 9/2009 | Korupolu | |

(Continued)

FOREIGN PATENT DOCUMENTS

| EP | 2194696 A1 | 6/2010 |
| EP | 1410213 B1 | 3/2011 |

(Continued)

OTHER PUBLICATIONS

Mell et al., "The NIST Definition of Cloud Computing", National Institute of Standards and Technology, NIST Special Publication 800-145, Sep. 2011, Gaitersburg, MD.

*Primary Examiner* — Vivek Srivastava
*Assistant Examiner* — Hermon Asres
(74) *Attorney, Agent, or Firm* — Mark G. Edwards

(57) ABSTRACT

A computer-implemented method may include running the process on a first processing node. The process running on the first processing node initially operates on first data. The method may include monitoring the process to identify a first data node that provides the first data to the process. In addition, the method may include determining whether performance would likely be improved by transferring the process to a second processing node. The method may include transferring the process to the second processing node. Further, the method may include transferring a result of the process operating on the first data from the second processing node to the first processing node.

14 Claims, 6 Drawing Sheets

(56) References Cited

U.S. PATENT DOCUMENTS

| | | | |
|---|---|---|---|
| 2010/0180024 A1* | 7/2010 | Barsness | G06F 9/466 709/224 |
| 2011/0276685 A1* | 11/2011 | de Waal | G06F 9/5072 709/224 |
| 2011/0314155 A1 | 12/2011 | Narayanaswamy et al. | |
| 2012/0023223 A1 | 1/2012 | Branch et al. | |
| 2013/0198388 A1* | 8/2013 | Dahn | H04L 63/1416 709/226 |

FOREIGN PATENT DOCUMENTS

| | | |
|---|---|---|
| EP | 2370900 A1 | 10/2011 |
| WO | 2012138339 A1 | 10/2012 |

* cited by examiner

PROCESS CAGE PROVIDING ATTRACTION TO DISTRIBUTED STORAGE

BACKGROUND

Embodiments generally relate to cloud computing, and more specifically to processing data stored on multiple nodes.

Remote storage is now available as a "cloud service" to consumers, businesses, and organizations. Cloud storage allows a user to upload files for storage. Cloud storage is generally accessed via an Application Programming Interface (API). Cloud storage access methods vary by provider. Some providers support a web service API. A web service API may be based on a Representational State Transfer (REST) architectural style in which objects (files) are accessed using Hypertext Transport Protocol (HTTP) as a transport. For example, a user may access files stored in the cloud via a Uniform Resource Locator (URL) using a web browser. Cloud storage may also be accessed using a file-based protocol. Examples of file-based protocols include NFS/Common Internet File System (CIFS) and File Transfer Protocol (FTP).

An application running on the local computer of a user may access a file from a cloud storage service. The application may down load a file, process the data locally, and then store results or other new data with the cloud storage service. In addition to storage, processing is now available as a "cloud service" and an application running in the cloud may access data stored in the cloud.

Apache Hadoop provides for storing and processing of data on multiple nodes. Hadoop Distributed File System (HDFS) is a distributed file system included in the Hadoop architecture. Hadoop generally requires that the logical storage layout of data be explicitly mapped out and understood by the HDFS before an application begins running.

SUMMARY

Embodiments are directed to methods, computer readable storage medium, and a computer system for locating a process based on data proximity. A computer-implemented method may include running the process on a first processing node. The process running on the first processing node initially operates on first data. The method may include monitoring the process to identify a first data node that provides the first data to the process. In addition, the method may include determining whether performance would likely be improved by transferring the process to a second processing node. The method may include transferring the process to the second processing node in response to determining that performance would likely be improved by transferring the process to the second processing node. Further, the method may include transferring a result of the process operating on the first data from the second processing node to the first processing node.

BRIEF DESCRIPTION OF THE SEVERAL VIEWS OF THE DRAWINGS

In the drawings and the Detailed Description, like numbers generally refer to like components, parts, steps, and processes.

DETAILED DESCRIPTION

Figure 1:
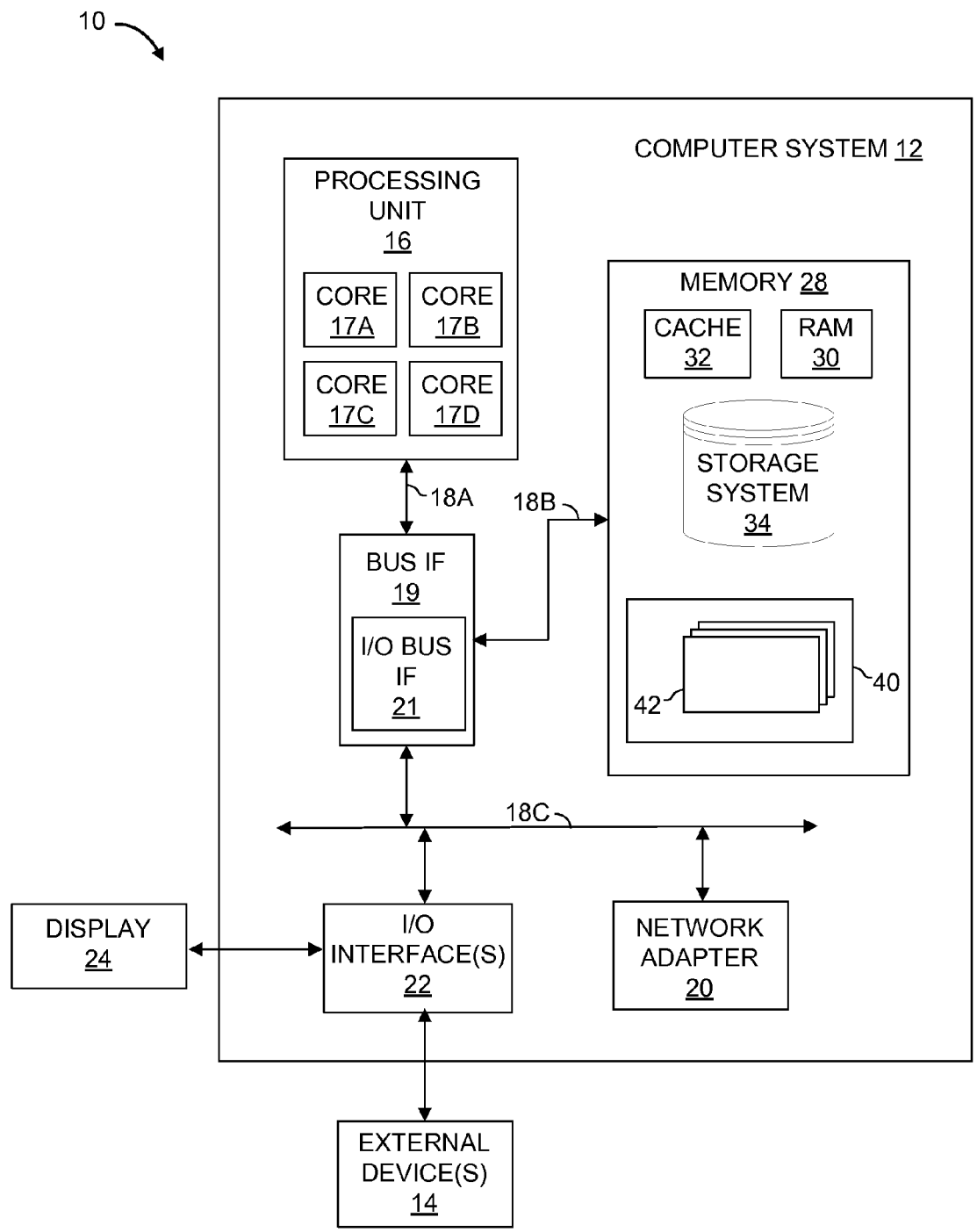
FIG. 1 depicts a cloud computing node which may be used in various embodiments.

According to various embodiments, a process may begin running on a processing node inside of a process cage. When the process starts running, it may not know where all of the data it will operate on is located. A data monitoring process also running in the process cage monitors input data and determines where the data the caged process requires is currently coming from. In addition, the data monitoring process may determine a network distance between the processing node and a data node where the data is currently or prospectively sourced from. A hop determining process running in the process cage determines whether performance would likely be improved by transferring the process cage to a second processing node close to the data node. If performance would likely be improved, the process cage may be transferred to the second processing node. When the caged process finishes operating on the data at the second processing node, results may be sent back to the originating processing node. According to various embodiments, a caged process may make two or more hops to other processing nodes in order to be at a close network distance to a data node. Embodiments may speed up a process and reduce network traffic. Embodiments may be implemented in a cloud computing environment or in any environment where data is distributed on multiple nodes.

Cloud Computing Overview

Although an overview of cloud computing is described in this section, embodiments are not limited to a cloud computing environment. Rather, embodiments may be implemented in conjunction with any type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDA)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer may not be provided with a capability to manage or control the underlying cloud infrastructure including network, servers, operating systems, storage, or even individual application capabilities. The consumer may be provided with a capability to manage user-specific application configuration settings. In addition, the consumer may be provided with a capability to employ a process cage and the process cage may have a capability to determine where a process runs in the cloud as described herein.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In addition, the consumer may be provided with a capability to employ a process cage and the process cage may have a capability to determine where a process runs in the cloud as described herein.

Infrastructure as a Service (IaaS): the capability provided to the consumer is to provision processing, storage, networks, and other fundamental computing resources where the consumer is able to deploy and run arbitrary software, which can include operating systems and applications. The consumer may not have a capability to manage or control the underlying cloud infrastructure. The consumer may have control over operating systems, storage, deployed applications, and possibly limited control of select networking components (e.g., host firewalls). In addition, the consumer may be provided with a capability to employ a process cage and the process cage may have a capability to determine where a process runs in the cloud as described herein.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example of a cloud computing node 10. Cloud computing node 10 is only one example of a suitable cloud computing node and is not intended to suggest any limitation as to the scope of use or functionality of various embodiments. Regardless, cloud computing node 10 is capable of being implemented and performing any of the functionality set forth herein.

Cloud computing node 10 may include a computer system 12, which is operational with numerous other general purpose or special purpose computing system environments or configurations. In various embodiments, the computer system 12 may be a server, e.g., a file server. In various embodiments, the computer system 12 may be a processing node or a data node. Further, in various embodiments, the computer system 12 may be both a processing node and a data node. Moreover, in various embodiments, the computer system 12 may be a local computing device 54. Examples of well-known computing systems, environments, or configurations that may be suitable for use with computer system 12 include, but are not limited to, personal computer systems, server computer systems, thin clients, thick clients, handheld or laptop devices, multiprocessor systems, microprocessor-based systems, set top boxes, programmable consumer electronics, portable consumer devices, such as smart phones and tablets, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and buses 18A, 18B, and 18C that couple various system components including system memory 28 to processor 16.

The processing unit 16 may contain multiple processors in various embodiments. Alternatively the processing unit 16 may include a single processor. Each processor 16 executes instructions stored in the memory 12 and may include one or more levels of on-board cache. Each processor 16 may include one or more cores 17, e.g., cores 17A-17D.

The buses 18A, 18B, and 18C represent one or more of any of several types of bus structures, including a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI express (PCIe). The computer system 12 may include a bus interface 19 and an I/O bus interface 21. The bus interface 19 may include a memory controller (not shown).

Computer system 12 typically includes a variety of computer system readable media. Such media may be any available media that is accessible by computer system 12, and may include both volatile and non-volatile media, removable and non-removable media.

System memory 28 may include computer system readable media in the form of volatile memory, such as random access memory (RAM) 30 or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. The memory 28 may include at least one program product having a set (e.g., at least one) of program modules that are configured to carry out the functions of various embodiments.

One or more programs/utilities 40, each having a set (at least one) of program modules 42 may be stored in memory 28. The programs/utilities 40 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 42 generally perform the functions or methodologies of various embodiments.

Computer system 12 may also communicate with one or more external devices 14 such as a keyboard, a pointing device, a display 24; one or more devices that enable a user to interact with computer system 12; or any devices (e.g., network card, modem, etc.) that enable computer system 12 to communicate with one or more other computing devices. Such communication can occur via one or more Input/Output (I/O) interfaces 22. In addition, computer system 12 may communicate with one or more networks, such as a local area network (LAN), a general wide area network (WAN), or a public network (e.g., the Internet), via one or more network adapters 20. As depicted, network adapter 20 communicates with the other components of computer system 12 via bus 18. Although not shown in FIG. 1, other hardware or software components may be used in conjunction with computer system 12. Examples, include, but are not limited to: microcode, device drivers, redundant processing units, external disk drive arrays, RAID systems, tape drives, and data archival storage systems.

Figure 2:
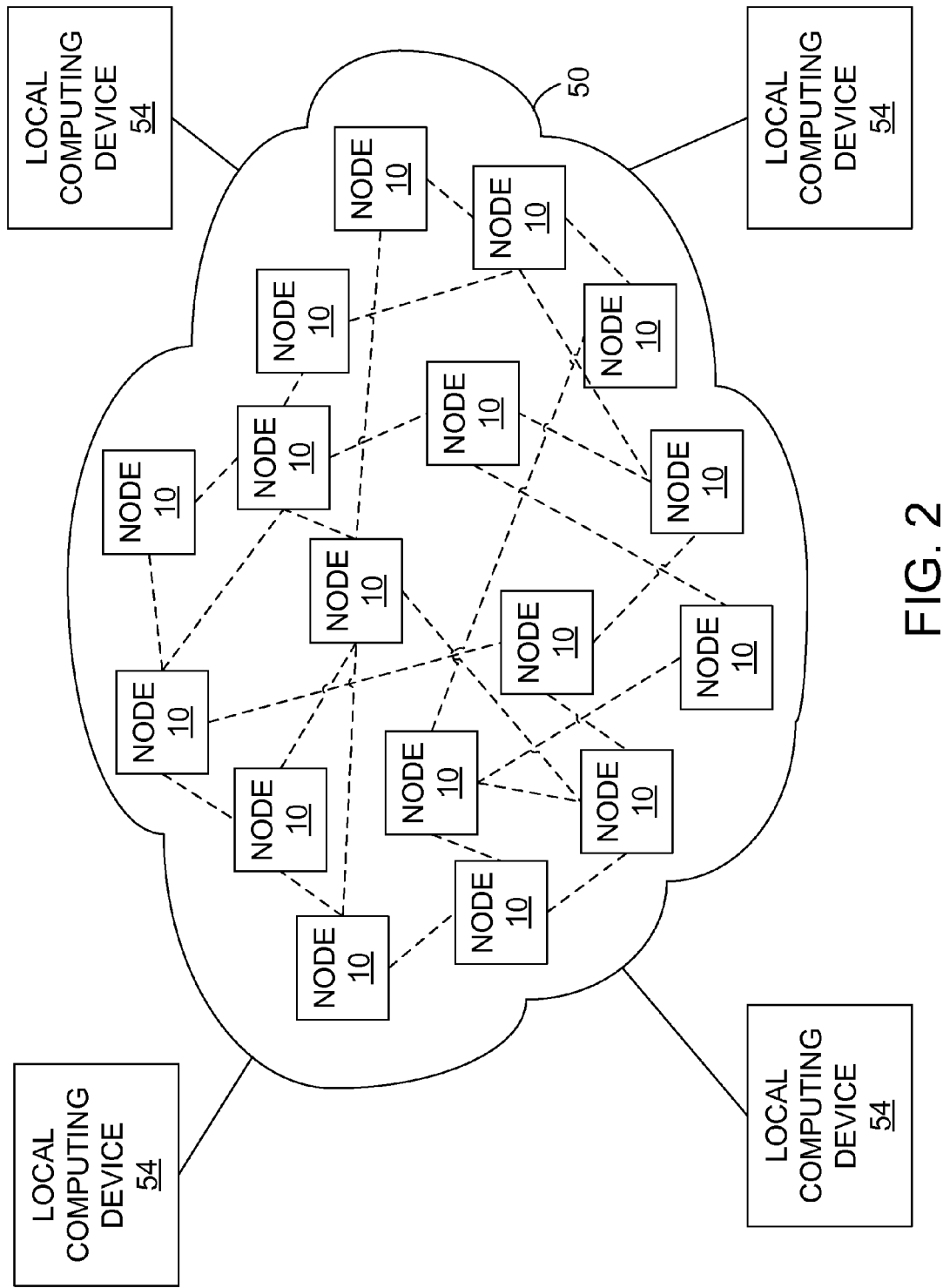
FIG. 2 depicts a cloud computing environment according to various embodiments.

FIG. 2 is a block diagram of an illustrative cloud computing environment 50. The cloud computing environment 50 may includes one or more cloud computing nodes 10. One or more local computing devices 54 may be used by cloud consumers. The local computing devices 54 may communicate with the cloud computing environment 50. The local computing devices 54 may include, for example, a PDA, or cellular or mobile, smart telephone, desktop computer, laptop computer, or automobile computer system. The nodes 10 may communicate with one another or with the local computing devices 54. They may be grouped (not shown) physically or virtually, in one or more networks, such as Private, Community, Public, or Hybrid clouds as described hereinabove, or a combination thereof. This allows cloud computing environment 50 to offer infrastructure, platforms or software as services for which a cloud consumer does not need to maintain resources on a local computing device. The types of computing devices shown in FIG. 2 are intended to be illustrative only and that computing nodes 10 and cloud computing environment 50 can communicate with any type of computerized device over any type of network or network addressable connection (e.g., using a web browser).

Figure 3:
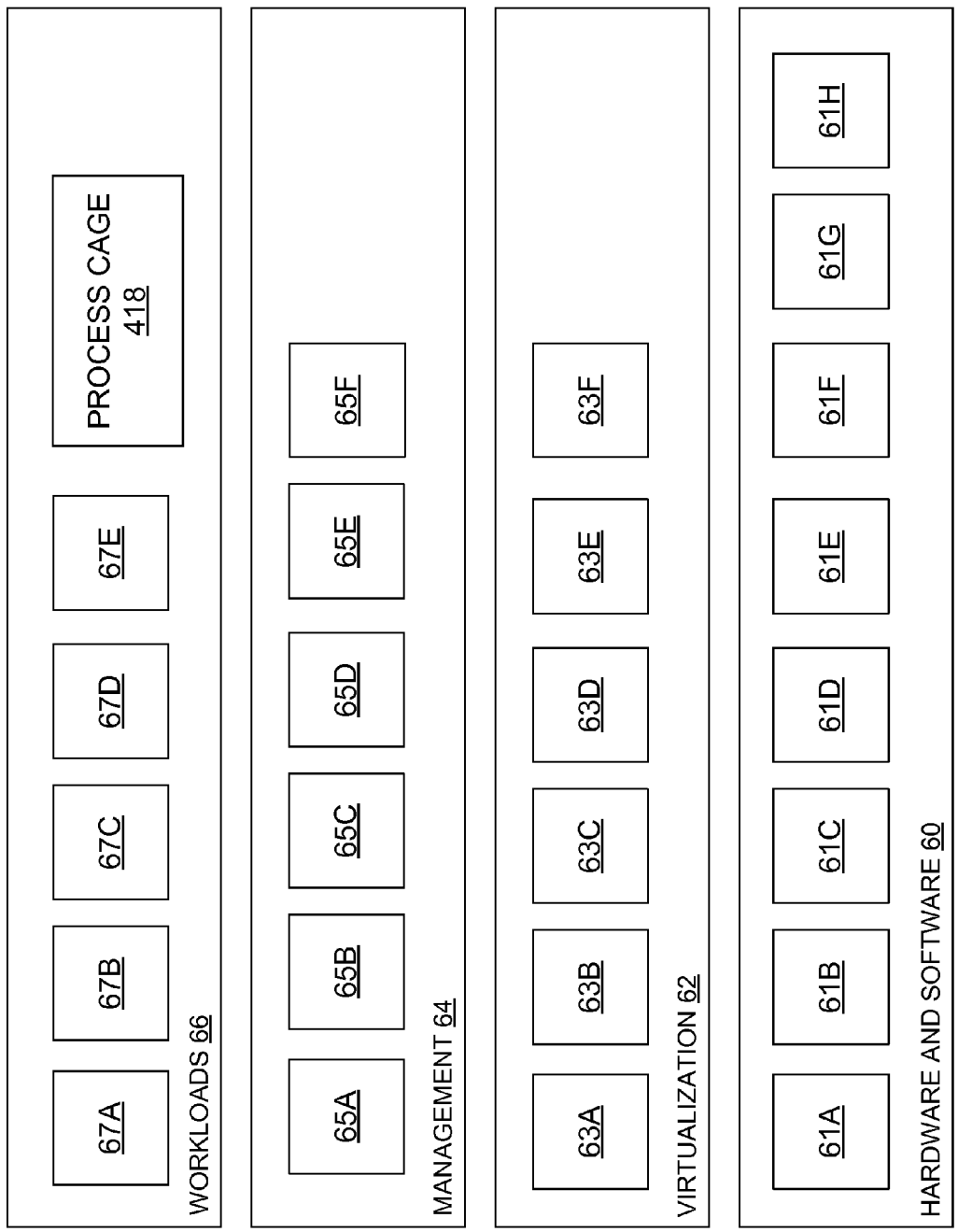
FIG. 3 depicts abstraction model layers of the cloud computing environment of FIG. 2 according to various embodiments.

FIG. 3 shows a set of functional abstraction layers provided by cloud computing environment 50. The functional abstraction layers may include a hardware and software layer 60, a virtualization layer 62, a management layer 64, and a workloads layer 66. The components, layers, and functions shown in FIG. 3 are intended to be illustrative only.

The hardware and software layer 60 may include hardware and software components 61. Examples of hardware components include mainframes 61A, in one example IBM® zSeries® systems; RISC (Reduced Instruction Set Computer) architecture based servers 61B, in one example IBM pSeries® systems; IBM xSeries® systems 61C; IBM BladeCenter® systems 61D; storage devices 61E; networks and networking components 61F. Examples of software components include network application server software 61G, in one example IBM WebSphere® application server software; and database software 61H, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 62 provides an abstraction layer from which the following examples of virtual entities may be provided: virtual servers 63A; virtual storage 63B; virtual networks 63C, including virtual private networks; virtual applications and operating systems 63D; and virtual clients 63E, 63F.

The management layer 64 may provide resource provisioning 65A, metering and pricing 65B, user portal 65C, service level management 65D, and SLA planning and fulfillment 65E. Resource provisioning 65A provides dynamic procurement of computing resources and other resources that are used to perform tasks within the cloud computing environment. Metering and pricing 65B provides cost tracking as resources are used within the cloud computing environment, and billing or invoicing for consumption of these resources. In one example, these resources may include application software licenses. User portal 65C provides access to the cloud computing environment for consumers and system administrators. Service level management 65D provides cloud computing resource allocation and management such that required service levels are met. Service Level Agreement (SLA) planning and fulfillment 65E provides pre-arrangement for, and procurement of, cloud computing resources for which a future requirement is anticipated in accordance with an SLA. Security 65F provides identity verification for cloud consumers and tasks, as well as protection for data and other resources.

The workloads layer 66 provides examples of functionality for which the cloud computing environment may be used. Examples of workloads and functions which may be provided from this layer include: mapping and navigation 67A; software development and lifecycle management 67B; virtual classroom education delivery 67C; data analytics processing 67D; transaction processing 67E; and a process cage 418 for one or more various processes.

Process Cage

One advantage of using the cloud to run applications and store data is that processing and storage capacity can be easily scaled up. However, if an application is being run remotely from the storage it is accessing, network latency required to bringing the data to the compute node may be a bottleneck that slows processing.

This disclosure describes a system and method for running a process closer to the storage it accesses without mapping out the data before the application is run. An advantage of the disclosed embodiments is that network traffic and lag may be reduced as compared with other approaches. Description of embodiments may use the term "process cage" because, in a figurative sense, a process, according to various embodiments, may be considered to be like a wild animal continually trying to get closer to food (the data the process is consuming) within limitations.

A computer program or application includes machine-readable instructions. When the instructions are executed by a processor, the actual execution may be referred to as a process. It is sometimes said that a process is an instance of a computer program or application that is being executed. A single application or program may be associated with one or more processes. A process typically includes current values of variables and other activity, e.g. a stack heap. A process may include one or more threads of execution ("threads"). A thread is the smallest sequence of programmed instructions that can be managed independently by an operating system scheduler. According to various embodiments, a process cage may contain one or more threads or one or more processes. However, to simplify this description, a process cage may be referred to as containing a single process.

According to various embodiments, a process may begin running on an originating processing node and the data the process operates on may be stored on one or more data nodes. The network locations of one or more data nodes may not be specified at the time the process is initiated. The process is run inside of an application container, referred to as a process cage. It is determined where the data the caged process requires is coming from and the "network distance" (latency or time required to access) between the processing node and the data node where the data is currently or prospectively sourced from. In addition, it is determined whether performance would likely be improved by transferring the process cage to a second processing node close to the data node. If performance would likely be improved, the process cage may be transferred to the second processing node. In practice, a process may be moved as close as possible to a data node when the process is relatively small and the size of the data at the remote data node or nodes is relatively large. When the caged process finishes operating on the data at the second processing node, results may be sent back to the originating processing node. According to various embodiments, a caged process may make two or more hops. Embodiments may speed up a process and reduce network traffic.

Figure 4:
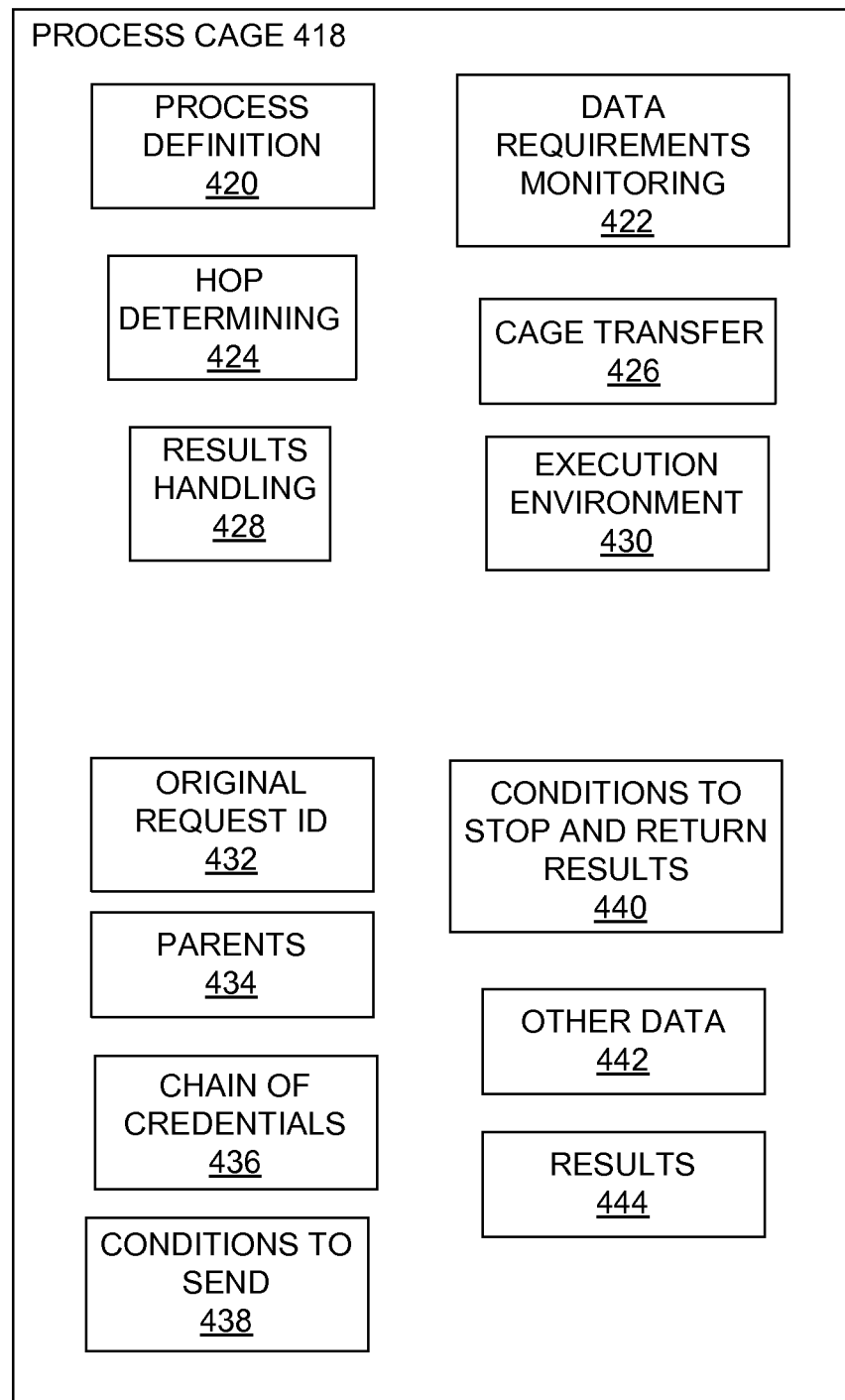
FIG. 4 illustrates a block diagram of a process cage according to various embodiments.

FIG. 4 illustrates a block diagram of a process cage 418 according to various embodiments. A process cage 418 may be stored in a memory 28 of a node 10. The process cage 418 may contain: a process definition 420, a data requirements monitoring process 422, a hop determining process 424, a process cage transferring process 426, and a results handling process 428. In addition, the process cage 418 may include an execution environment 430 in various embodiments. For example, the execution environment 430 may be an OSGi (Open Services Gateway imitative)/Eclipse (multi-language integrated development environment) environment.

The process definition 420 may include executable code of one or more processes or threads. The code may be a web application, such as a Node.JS application. In various embodiments, the code may be a Java application or an application written in any other suitable language.

The data requirements monitoring process 422 determines where the data the caged process 420 requires is coming from and the "network distance" (latency or time required to access) between the processing node and the data node where the data is currently or prospectively sourced from. Network distance may or may not be correlated with physical distance. For example, consider a process running on a first node that accesses data on a second node. If the first and second nodes are located in the same physical rack of servers, the network distance (latency) may generally be short as compared with a situation where the first and second nodes are located in different cities. However, there may be situations where the network distance between first and second nodes located in different cities is actually shorter than first and second nodes located in the same rack or same data center. The data requirements monitoring process 422 makes its determinations as the caged process 420 is processing data. The data requirements monitoring process 422 may perform code inspection, cache inspection, or network inspection to determine where data is coming from.

As one example, a caged process 420 may use URLs to access data. The physical location of the data may be determined via the host or path components. A cloud may provide a geographical location service or registry that includes a database of IP addresses or URLs and their geographical locations. The data requirements monitoring process 422 may query a cloud geographical location service to determine the geographical location of an IP address or URL. The data requirements monitoring process 422 may determine that the next sets of data are coming from one specific set of URLs, and based on this, may determine that the next data is physically grouped at a particular geographical location. For example, data accessed at the URL http://foo.com/us/data/ might be stored at different geographical location than data accessed at the URL http://foo.com/eu/data/. Accordingly, the data requirements monitoring process 422 may monitor the URL patterns to determine whether a hop may be likely to improve performance. Determining that the next data is physically grouped at a particular geographical location may provide a hint that the network distance (latency) associated with the next data will be larger than a current network distance. The hint may inform a determination of whether a process transfer would be likely to improve performance.

The hop determining process 424 also runs inside the process cage 418. When the data requirements monitoring process 422 determines that the data the caged process 420 is currently or prospectively consuming is stored at a particular data node, the hop determining process 424 may locate a second processing node near that data node. In addition, the hop determining process 424 may determine whether performance would likely be improved by transferring the process cage 418 to the second processing node close to the data node.

The hop determining process 424 may query a service in the cloud infrastructure to determine one or more processing nodes close to the data node. The query may request processing nodes near the data node. Alternatively, the query may request the location of the data node and use a registry on the current processing node to determine processing nodes near the data node. In yet another alternative, the hop determining process 424 may generate a broadcast or multicast request for nodes within a specified network distance, e.g., 1 ms, to identify themselves.

After the hop determining process 424 locates a second processing node near the data node, the hop determining process 424 may determine whether a hop would likely improve performance.

In various embodiments, the hop determining process 424 may estimate a quantity of data required at the data node and an estimated time to copy that quantity of data from the data node to the current processing node. If the estimated data copy time is outside, e.g., greater, than a threshold time period, the hop determining process 424 may determine that the hop would likely improve performance.

In various embodiments, the hop determining process 424 may determine a quantity of data recently input from the data node and the time that was required to copy that data from the data node to the current processing node. If the actual data copy time is greater than a threshold time period, the hop determining process 424 may determine that the hop would likely improve performance.

In various embodiments, the hop determining process 424 may estimate a time required ("process transfer latency") to transfer the process cage 418 from the current processing node to a second processing node near the data node. In addition, the hop determining process 424 may estimate an amount of data required at the data node and a "data latency delta" associated with the estimated quantity of data. In various embodiments, the data latency delta may be the difference between the time required to transfer the data from the data node to the current processing node and the time required to transfer the data from the data node to the second processing node. If the process transfer latency is less than the data latency delta, the hop determining process 424 may determine that the hop would likely improve performance.

The hop determining process 424 may make an estimate and determine, based on the estimate, that a hop would likely improve performance. The process is then moved to the second processing node. After the transfer, the hop determining process 424 may again determine whether a hop to another node would likely improve performance. In some situations, the hop determining process 424 may determine that a hop back to the first node would likely improve performance. This could lead to a thrashing situation. Thrashing may sometimes result because the estimates were not accurate enough. In various embodiments, where the node to be hopped to to improve performance is a node where the process was last run, the above-mentioned thresholds used by the hop determining process 424 may be modified, e.g., increased.

The hop determining process 424 may obtain latency information for transfers between various data and processing nodes from a cloud network monitoring service.

Accordingly, the process cage 418 enables the caged process 420 to run itself as close as possible to the data it requires whenever estimates of the latency cost of transferring the caged process 420 do not outweigh the latency savings associated with being close to the data. In practice, a process may be moved as close as possible to a data node when the size (in bytes) of the process is relatively small and the size of the data at the remote data node is relatively large.

The process cage transferring process 426 may cause the process cage to be transferred from a current processing node to another processing node closer to the data node where the data is currently or prospectively sourced from. The process cage transferring process 426 may copy over an application with its current heap stack to another computer node. The application may be a Node.JS application, a Java application, or an application written in any other suitable language. Alternatively, the application may be copied via a network request, such as HTTP. In yet another alternative, the application may be mailed to the new processing node using an asynchronous approach. In various embodiments, the process cage transferring process 426 may employ any suitable technique.

In one embodiment, the process cage transferring process 426 may determine that it is possible map a URL used to access a data node to a local reference or a more efficient transport mechanism. The process cage transferring process 426 may further remap a URL to a local reference or implement a more efficient transport mechanism in lieu of or in addition to causing a process cage transfer. In one embodiment, the process cage transferring process 426 may cause data stored at a data note to be brought to the current computation node as a background process.

The results handling process 428 may send results back to the originating processing node when the caged process 420 finishes operating on the data at the second processing node.

The results handling process 428 may determine what is to be sent back to the originating processing node. In one alternative, it may be determined to send the results of the query directly back. In another alternative, it may be determined to send the entire process cage 418 back as an executable unit that contains the results encoded as a resource.

The results handling process 428 may determine a transport technique. For example, it may be determined to send the results back synchronously, such as via a network request, e.g., HTTP. Alternatively, it may be determined to send the results back asynchronously, e.g., the application may be mailed to the originating processing node.

The results handling process 428 may determine where to send the results. In one alternative, it may be determined to send the results directly to the parent or originating processing node. If the parent node is unavailable, an error handling process may be included to send the results up the chain of nodes that were hopped during processing. In another alternative, it may be determined to send the results to an original requester. In yet another alternative, it may be determined to send the results to the furthest ancestor that is available.

Referring still to FIG. 4, in addition to various processes, the process cage 418 may contain (at various times): an original request identifier 432; one or more parent nodes 434; a chain of credentials 436; one or more conditions to send 438; one or more conditions to stop processing and return results 440; one or more other data elements 442; and results 444.

The original request identifier 432 may identify an originating processing node or an original requester. The original request identifier 432 may be used to keep the process cage 418 from looping on the same execution environment location. The execution environment can have some thrash avoidance logic to prevent the process from going back and forth between the same few nodes. In various embodiments, the hop determining process 424 may determine not only what data the process needs next, but data that the process will need after or subsequent to processing the next data. For example, process may be operating on first data at a first node and the hop determining process 424 may determine that the process next needs to operate on second data stored at a second node. In addition, the hop determining process 424 may determine that the process will need third data stored at a third node after processing the second data. The original request identifier 432 may be used to determine whether the third node is the first node (that is, the node from where the process was previously transferred from). If the third data is on the first node, the hop determining process 424 may notify the process or the execution environment to determine if reordering the data requirements is possible. If the data may be reordered, the process may process the third data on the first node before hopping to the second node to process the second data.

In various embodiments, the hop determining process 424 may determine that a process running on a first processing node will need first data stored at a first node, second data stored at second node, third data stored at third node, fourth data stored at fourth node, fifth data stored at fifth node, and so on. In various embodiments, the hop determining process 424 may determine to deploy the execution environment containing the process on a second processing node near two or more data nodes. For example, the network distance between the second processing node and the second data node may be below a threshold, and the network distance between the second processing node and the third data node may be below the threshold. In this situation, the hop determining process 424 may determine to deploy the process on the second processing node because it is close to both data nodes. While the process runs on the second processing node, it may operate on the second data stored at the second data node and the third data stored at the fourth third data node.

The one or more parents 434 may be, for example, a list of endpoints that were called to get to a current node.

The chain of credentials 436 may be, for example, credentials from each node in the chain that provide the process cage with authorization to access data, compute cycles, or both. Credentials in an authorization chain allow the process cage 418 to execute and access data at various nodes. When the process cage 418 hops to a new processing node, it may be required to obtain authorization to use processing resources or to access data from that processing node. For example, a process cage 418 may jump to a processing node to access image data. The owner of the processing node may have their image data stored in the cloud. The process cage 418 may request access to the image data stored in the cloud and then jump to a processing node in the cloud near the image data. There may be an additional authorization for each hop and the authorization chain or chain of credentials 436 stores these authorizations.

The conditions to send 438 may specify one or more conditions that must be satisfied in order for a transfer to occur. For example, a condition may specify that the process cage 418 may only be sent using broadband access. If broadband access is not available, the transfer is not permitted to occur. The conditions to send 438 may be specified in an original request. The conditions to send 438 may be due, for example, to financial costs associated with a cellular telephone network.

The process cage 418 may include conditions to stop and return results 440. User requirements may specify that an application stop traversing for more data based on one or more conditions. One example of a stop and return results condition is when a particular percent, e.g., one percent, of the data has been returned. Another example is when a particular number of hops, e.g., four hops, have occurred. Yet another example arises in the context of a search. The search may specify one or more conditions. For example, a search request may be directed to search for two or more different sub-images within different images, e.g., person A and person B in multiple digital photographs. The search request may specify that data be search until one or more confidence parameters are satisfied. An example stop and return results condition is when 75% of the images searched include person A and 20% of the images searched include person B.

The process cage 418 may include other data 442. As one example, the other data 442 may include current values of program variables, e.g., the current heap stack.

The process cage 418 may include data results 444. The results 444 may include intermediate or final results generated from processing data. In addition, the results 444 may include information or statistics about the processing results. For example, user requirements may restrict the number of hops or the processing time. Not all of the available data may be processed in the restricted number of hops or limited processing time. Information may be provided with the results, for example, that specifies a quantity or a percentage of available data that was processed. In other embodiments, the process may be configured to search for a particular result and it may not be possible to be certain that the result is in fact the result that the user requested. For example, the process may search images for the presence of a particular visual object, e.g., a face in the image. The result may be one or more images and the result may be accompanied with information or statistics that indicate how much confidence to place in the search result. For example, the information may be that there is an 80% confidence that a first result that the searched for face is in image A, and a 65% confidence that a second result that the searched for face is in image B. In addition, the result may be accompanied with an error report indicating that the processing encountered one or more errors.

Figure 5:
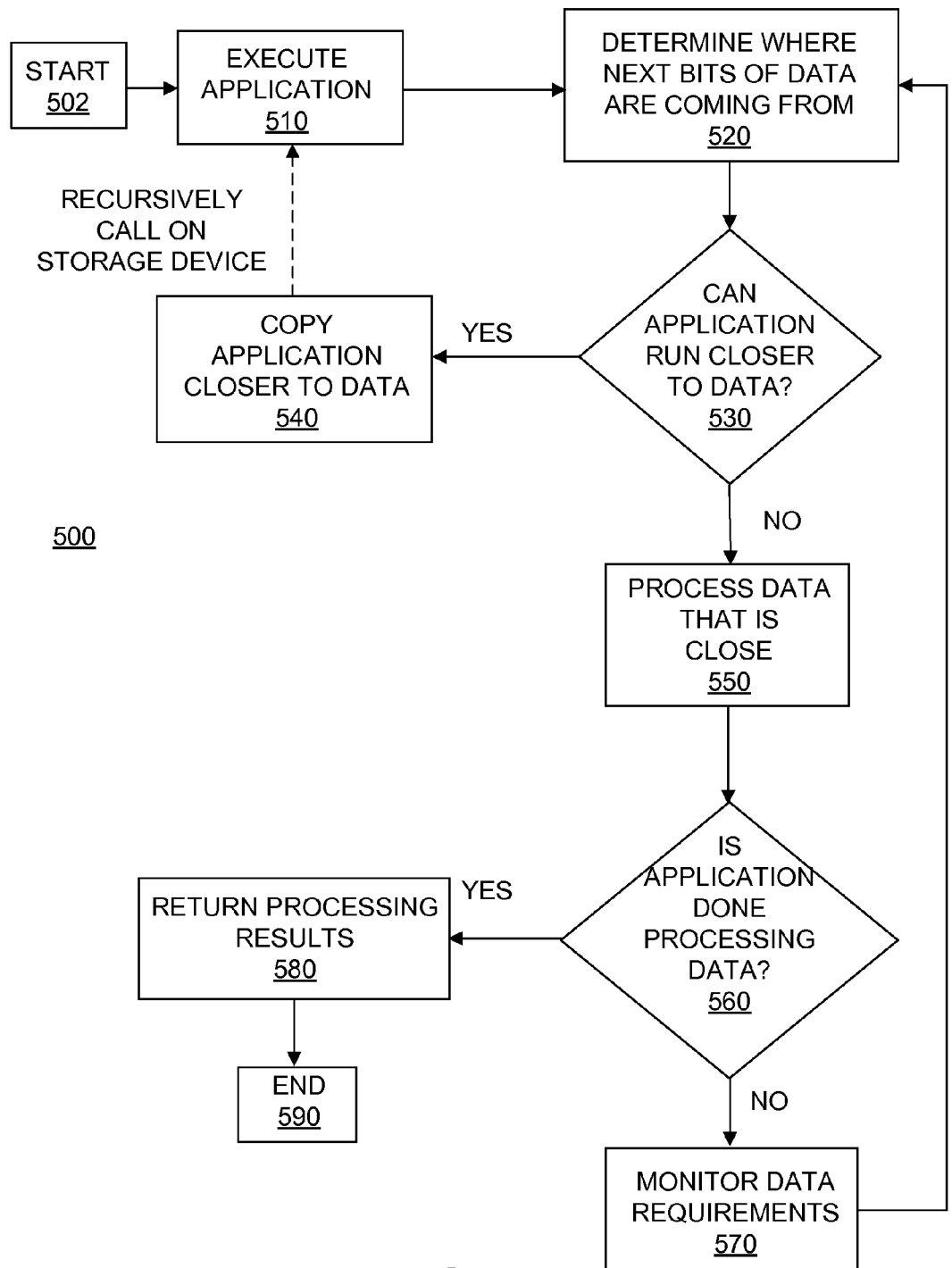
FIG. 5 depicts an example process for moving a process cage to a storage location according to various alternative embodiments.

FIG. 5 depicts a process 500 for locating a process (within a process cage) based on data proximity according to various alternative embodiments. The process 500 starts in operation 502. The process 500 may start on a local computing device 54 or on a compute node 10. In operation 510, an application may begin executing. In operation 520, a data monitoring process may be performed in parallel with other processes of the application. The data monitoring operation 520 may be performed on the entire application or on one or more processes or one or more threads of the application. In various embodiments, the data monitoring operation 520 may be performed by the data requirements monitoring process 422. The data monitoring operation 520 may determine where the data the caged process requires is coming from and the network distance between the processing node and the data node where the data is currently or prospectively sourced from.

In operation 530, it may be determined whether the application can run on a node closer to the node where the data currently or prospectively being accessed is located. In various embodiments, the operation 530 may be performed by the hop determining process 424. The operation 530 may include locating a second processing node near the data node. In addition, the operation 530 may include determining whether performance would likely be improved by transferring the process cage to a second processing node close to the data node.

In operation 540, the process cage may be transferred to a node closer to the node storing data currently or prospectively accessed if it is determined in operation 530 that performance would likely be improved by transferring the process cage 418 to a processing node close to that data node. In various embodiments, the operation 540 may be performed by the process cage transferring process 426. If it is determined in operation 530 that performance is not likely to be improved by transferring the process cage 418 to another data node, the process may continue to be executed on the current processing node (operation 550), which may be a processing node close to the data node.

In operation 560, it may be determined whether a caged process has completed processing. If the caged process has not completed processing, a data monitoring process may be performed or resumed in operation 570. In various embodiments, the operation 570 may be the same as the operation 520. If the caged process has completed processing, results may be returned in operation 580 and the process 500 may end in operation 590. In various embodiments, the results returning operation 580 may be performed by the results handling process 428.

Figure 6:
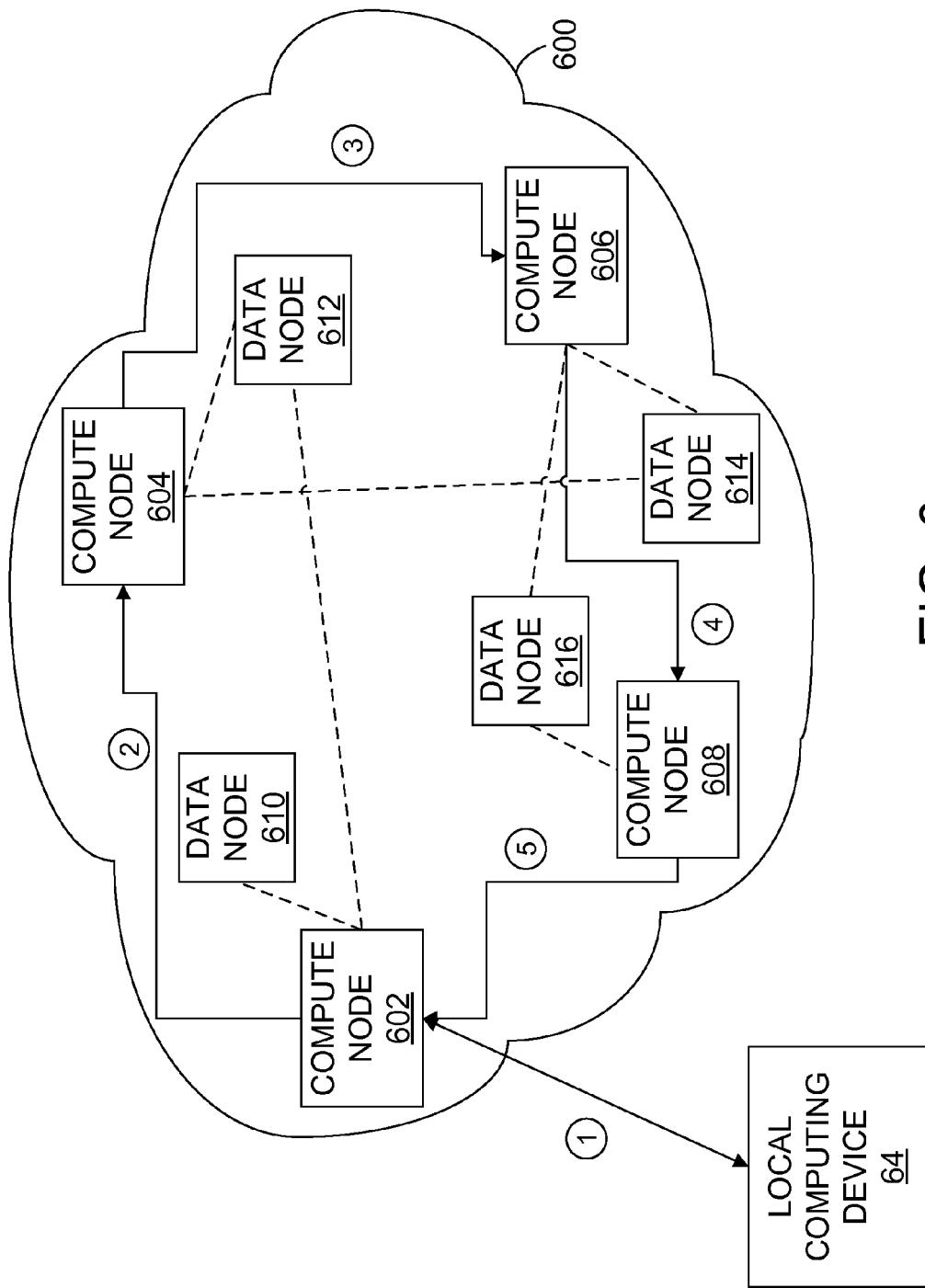
FIG. 6 is a block diagram of a multi-node computing environment, such as a cloud computing environment, that illustrates an example according to various embodiments.

FIG. 6 is a block diagram of a multi-node computing environment 600, such as a cloud computing environment 50, that illustrates an example according to various embodiments. The caged process in this example may be any search method. For example, a process that searches images for particular content, such as searching for an image of a red hat or a particular face. The search process may search still or video image data. In either case, the quantity of data may be relatively large as compared with a caged search process and the image data may be distributed on multiple nodes, so it may an advantage to have the search process execute close to the data.

In this example, referring to FIG. 6, the application having the search method may start running on local computing device 64. When the application starts running, it may not know where the image data to be searched is located. In fact, multiple images may be stored on multiple data nodes 610, 612, 614, and 616. In one variation, images may be stored at a data node outside of a cloud computing environment, such as on a local device, e.g., a mobile device, such as a smart phone.

At 1, the search process may be transferred to a compute node 602 and enclosed in a process cage. At compute node 602, a data monitoring process may initially determine that data is coming from data node 610. Subsequently, the data monitoring process determines that the data required (currently or prospectively) by the search process is located at data node 612. In this example, assume that it is determined that performance would likely be improved by transferring the process cage to a processing node close to the data node 612. It may be determined that compute node 604 is close to data node 612. In addition, it may be determined that compute node 604 has available processing capacity. Search results obtained by the search process thus far from image data at compute node 610 may be saved in the process cage. Appropriate permissions to access data on data node 612 may be obtained. The process cage may pause the caged process and transfer the process (at 2) to compute node 604 where the search process is restarted, accessing image data on data node 612. Processing may continue at compute node 604 until it is eventually determined that performance would likely be improved by transferring (at 3) the process cage to compute node 606 to be near data on data node 614.

The process cage may be transferred as many times as is suitable for a particular application or request. In the example of FIG. 6, the process cage may be transferred (at 4) to compute node 608 to be near data on data node 616. While on compute node 618, it may be determined that all image data has been searched or that some other condition to stop execution and return results has been satisfied. Results may be sent to originating processing node 602 (at 5) or to the node that made the original request, i.e., local computing device 64. Results may be sent directly or back up the chain of nodes to the original requester.

While the example of FIG. 6 has been described with respect to an image searching process, other embodiments may include applications that perform data mining. For example, a data mining method may seek to identify correlations in relatively large quantities of data distributed on multiple nodes. Still other embodiments may include a process that search of text or music (audio) data. Further, some embodiments may include processes that operate on various types of business or organizational records, such as medical product records, sales and distribution records, Center for Disease Control (CDC) records, drug sales records. For example, processes that operate on (CDC) records and drug sales records may seek to determine relationships between medical conditions and drugs consumed by local communities. Yet another example, financial data, such as that related to a stock market or company earnings may be stored on distributed data nodes. Rather than downloading all the data, various analytic filters may be placed in a process cage which may hop to one or more data nodes and return a result to an originating location.

Referring back to FIG. 1, in various embodiments, the computer system 12 may be a multi-user mainframe computer system, a single-user system, or a server computer or similar device that has little or no direct user interface, but receives requests from other computer systems (clients). In other embodiments, the computer system 12 may be implemented as a desktop computer, portable computer, laptop or notebook computer, tablet computer, pocket computer, telephone, smart phone, or any other appropriate type of electronic device.

The computer system 12 may include some or all of the hardware and/or computer program elements of the computer system 12. The various program components implementing various embodiments of the various embodiments may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 12 and that, when read and executed by one or more processors in the computer system 12, or when interpreted by instructions that are executed by one or more processors, cause the computer system 12 to perform the actions necessary to execute steps or elements including the various aspects of embodiments of the various embodiments. Aspects of the various embodiments may be embodied as a system, method, or computer program product. Accordingly, aspects of the various embodiments may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, various embodiments may take the form of a computer program product embodied in one or more computer-readable medium(s) having computer-readable program code embodied thereon.

Any combination of one or more computer-readable medium(s) may be used. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of the various embodiments may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the various embodiments are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of the various embodiments may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Various embodiments may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment. But, any particular program nomenclature used herein is used merely for convenience, and thus various embodiments are not limited to use solely in any specific application identified and/or implied by such nomenclature. The exemplary environments illustrated in FIG. 1 are not intended to limit the various embodiments. Indeed, other alternative hardware and/or program environments may be used without departing from the scope of the various embodiments.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

A variety of examples are presented in this Detailed Description. These examples may be referred to as exemplary. Note that the term "exemplary," as used in this Detailed Description, simply means an example, instance, or illustration. This term is not used to mean that a particular example is superior, commendable, or otherwise deserving of imitation over other examples.

While this disclosure has described the details of various embodiments shown in the drawings, these details are not intended to limit the scope of the inventions as claimed in the appended claims.

What is claimed is:

1. A computer-implemented method for locating a process based on an expected time required to access data operated on by the process, without mapping out the data before the process is run, comprising:
    running a process cage on a first processing node, wherein the process is run inside of the process cage, the process cage containing one or more processes, and wherein the process is operating on first data;
    identifying a first data node, wherein the first data node stores the first data and provides the first data to the process cage, the first data node being separate from the first processing node;
    determining whether performance would likely be improved by transferring the process cage to a second processing node, wherein the determining includes
        estimating a quantity of the first data required from the first data node,
        estimating a first data copy time to copy the estimated quantity of the first data from the first data node to the first processing node,
        estimating a second data copy time to copy the estimated quantity of the first data from the first data node to the second processing node, and
        determining a difference between the first and second data copy times;
    in response to determining that performance would likely be improved by transferring the process cage to the second processing node, performing a first transfer of the process cage to the second processing node;
    subsequent to the first transfer of the process cage to the second processing node, preventing a second transfer of the process cage back to the first processing node, wherein the preventing the second transfer includes using thrash avoidance logic;
    determining a result of the process, wherein the result includes information and statistics about the process; and
    transferring the result of the process from the second processing node to the first processing node, wherein transferring the result includes determining a transport technique.

2. The method of claim 1, wherein the determining of whether performance would likely be improved by transferring the process cage to a second processing node includes:
    estimating a quantity of the first data prospectively required from the first data node; and
    determining whether the estimated first data copy time is outside of a threshold time period.

3. The method of claim 1, further comprising:
    estimating a process transfer latency time required to transfer the process cage from the first processing node to the second processing node; and
    determining whether the process transfer latency time is outside of the difference between the first and second data copy times.

4. The method of claim 1, further comprising:
    identifying a second data node that will provide second data to the process cage subsequent to the first data node providing the first data to the process cage; and
    wherein the determining of whether performance would likely be improved by transferring the process cage to the second processing node includes
        estimating a quantity of the second data required from the second data node, and
        estimating a third data copy time to copy the estimated quantity of the second data from the second data node to the second processing node.

5. The method of claim 1, further comprising:
    running the process on the second processing node;
    identifying a second data node providing second data to the process cage;
    determining whether performance would likely be improved by transferring the process cage to a third processing node; and
    transferring the process cage to the third processing node.

6. The method of claim 1, wherein the preventing the second transfer of the process cage back to the first processing node includes preventing the second transfer of the process cage back to the first processing node prior to the determining the result of the process.

7. The method of claim 1, wherein the process accesses the first data on the first data node using a uniform resource locator and the process is a web application.

8. The method of claim 1, wherein the performing the first transfer of the process cage to the second processing node includes transferring the process cage in a container and the container includes a chain of credentials.

9. A system for locating a process based on an expected time required to access data operated on by the process, without mapping out the data before the process is run, comprising:

a first data node having a processor and a memory, the memory to store first data; and a first processing node having a processor and a memory to store instructions of the process, wherein the process is run inside of a process cage, the process cage containing one or more processes, and the process cage comprising a data requirements monitoring process, a hop determining process, a process transferring process, and a results handling process, wherein the processor, when executing the instructions, causes the process cage to operate on the first data, the data requirements monitoring process to identify the first data node as providing the first data to the process cage, the first data node being separate from the first processing node;

the hop determining process to determine whether performance would likely be improved by transferring the process cage to a second processing node having a processor and a memory, wherein the determining includes estimating a quantity of the first data required from the first data node, estimating a first data copy time to copy the estimated quantity of the first data from the first data node to the first processing node, estimating a second data copy time to copy the estimated quantity of the first data from the first data node to the second processing node, and determining a difference between the first and second data copy times;

the process transferring process to perform a first transfer of the process cage to the second processing node in response to the hop determining process determining that performance would likely be improved by transferring the process cage to the second processing node;

the process transferring process to prevent a second transfer of the process cage back to the first processing node subsequent to the first transfer of the process cage to the second processing node and prior to determining a result of the process, wherein preventing the second transfer includes using thrash avoidance logic;

the results handling process to determine the result of the process, wherein the result includes information and statistics about the process; and the results handling process to transfer the result of the process from the second processing node to the first processing node, wherein transferring the result includes determining a transport technique.

10. The system of claim 9, wherein, when executing the instructions of the hop determining process to determine whether performance would likely be improved by transferring the process cage to the second processing node, the processor of the first processing node:

estimates a quantity of the first data prospectively required from the first data node; and determines whether the estimated first data copy time is outside of a threshold time period.

11. The system of claim 9, wherein the memory of the second processing node stores instructions of the process, the data requirements monitoring process, the hop determining process, and the process transferring process, wherein the processor, when executing the instructions, causes:

the process cage to operate on the second processing node;

the data requirements monitoring process to identify a third data node providing second data to the process cage, the third data node having a processor and a memory to store the second data;

the hop determining process to determine whether performance would likely be improved by transferring the process cage to a third processing node; and the process transferring process to transfer the process cage to the third processing node in response to the hop determining process determining that performance would likely be improved by transferring the process cage to the third processing node.

12. A computer program product for locating a process based on an expected time required to access data operated on by the process without mapping out the data before the process is run, the computer program product comprising a non-transitory computer readable storage medium having program code embodied therewith, the program code comprising computer readable program code executable by a processor to:

run a process cage on a first processing node, wherein the process is run inside of the process cage, the process cage containing one or more processes, and wherein the first processing node includes a processor and a memory to store instructions of the process;

identify, for the process cage running on the first processing node and operating on first data, a first data node, wherein the first data node stores the first data and provides the first data to the process cage, and the first data node includes a processor and a memory to store the first data, wherein the first data node is separate from the first processing node;

determine whether performance would likely be improved by transferring the process cage to a second processing node, wherein determining includes estimating a quantity of the first data required from the first data node, estimating a first data copy time to copy the estimated quantity of the first data from the first data node to the first processing node, estimating a second data copy time to copy the estimated quantity of the first data from the first data node to the second processing node, and determining a difference between the first and second data copy times;

in response to determining that performance would likely be improved by performing a first transfer of the process cage to the second processing node, transfer the process cage to the second processing node;

subsequent to the first transfer of the process cage to the second processing node, prevent a second transfer of the process back to the first processing node prior to determining a result of the process, wherein preventing the second transfer includes using thrash avoidance logic;

determine the result of the process, wherein the result includes information and statistics about the process; and transfer the result of the process from the second processing node to the first processing node, wherein transferring the result includes determining a transport technique.

13. The computer program product of claim 12, wherein the determining of whether performance would likely be improved by transferring the process cage to a second processing node comprises:

estimating a quantity of the first data prospectively required from the first data node; and determining whether the estimated first data copy time is outside of a threshold time period.

14. The computer program product of claim 12, wherein the determining of whether performance would likely be improved by transferring the process cage to a second processing node includes:

estimating a process transfer latency time required to transfer the process cage from the first processing node to the second processing node; and determining whether the process transfer latency time is outside of the difference between the first and second data copy times.

* * * * *